US005145012A

United States Patent [19]
Hutchins et al.

[11] Patent Number: 5,145,012

[45] Date of Patent: Sep. 8, 1992

[54] METHOD FOR SELECTIVELY REDUCING SUBTERRANEAN WATER PERMEABILITY

[75] Inventors: Richard D. Hutchins, Placentia; Burton B. Sandiford, Balboa Island; Hoai T. Dovan, Yorba Linda, all of Calif.

[73] Assignee: Union Oil Company of California, Los Angeles, Calif.

[21] Appl. No.: 631,863

[22] Filed: Dec. 21, 1990

[51] Int. Cl.$^5$ .............. E21B 33/138; E21B 43/12; E21B 43/22

[52] U.S. Cl. .................. 166/292; 166/270; 166/294; 166/295; 166/300

[58] Field of Search .......... 166/270, 273, 274, 285, 166/292, 293, 294, 295, 300, 305.1

[56] References Cited

U.S. PATENT DOCUMENTS

| | | |
|---|---|---|
| 2,059,459 | 11/1936 | Hund et al. |
| 2,434,605 | 1/1948 | Wrightsman ............ 166/294 |
| 3,301,723 | 1/1967 | Chrisp .................. 149/20 |
| 3,306,870 | 2/1967 | Eilers et al. |
| 3,369,602 | 2/1968 | Fallgatter et al. |
| 3,416,603 | 12/1968 | Bernard ................ 166/295 |
| 3,437,141 | 10/1967 | Brandner et al. ........ 166/273 |
| 3,482,636 | 12/1969 | Crowe ................. 166/307 |
| 3,613,790 | 10/1971 | Stout et al. ........... 166/294 |
| 3,687,200 | 8/1972 | Routson .............. 166/275 |
| 3,727,689 | 4/1973 | Clampitt ............. 166/283 |
| 3,740,360 | 6/1973 | Nimerick ............ 260/17.4 |
| 3,749,174 | 7/1973 | Friedman et al. ...... 166/294 |
| 3,782,467 | 1/1974 | Hessert .............. 166/261 |
| 3,785,437 | 1/1974 | Clampitt et al. ....... 166/281 |
| 3,818,998 | 6/1974 | Hessert .............. 175/72 |
| 3,881,552 | 5/1975 | Hessert .............. 166/294 |
| 3,908,760 | 9/1975 | Clampitt et al. ....... 166/246 |
| 3,921,733 | 11/1975 | Clampitt ............. 175/65 |
| 3,926,258 | 12/1975 | Hessert et al. ........ 166/294 |
| 3,971,440 | 7/1976 | Hessert et al. ........ 166/270 |
| 3,978,928 | 9/1976 | Clampitt ............. 166/294 |
| 4,015,995 | 4/1977 | Hess ................. 166/295 X |
| 4,018,286 | 4/1977 | Gall et al. ............ 166/295 |
| 4,040,484 | 8/1977 | Hessert .............. 166/294 |
| 4,110,230 | 8/1978 | Hessert et al. ........ 252/8.551 |
| 4,157,116 | 6/1979 | Coulter .............. 166/280 |
| 4,290,485 | 9/1981 | Free et al. ........... 166/281 |
| 4,413,680 | 11/1983 | Sandiford et al. ...... 166/270 |
| 4,460,751 | 7/1984 | Hanlon et al. ........ 525/371 |
| 4,464,270 | 8/1984 | Hollenbeck et al. .... 252/8.551 |
| 4,470,915 | 9/1984 | Conway ............. 252/8.551 |
| 4,494,606 | 1/1985 | Sydansk ............. 166/295 |
| 4,498,539 | 2/1985 | Bruning ............. 166/294 |
| 4,502,967 | 3/1985 | Conway ............. 252/8.551 |

(List continued on next page.)

OTHER PUBLICATIONS

Zaitoun et al., "Modification of Water/Oil and Water/Gas Relative Permeabilities After Polymer Treatment of Oil or Gas Wells", paper presented at the 1987 Fourth Eur. Symp. on EOR, Hamburg, Oct. 27-29, Proceedings pp.839-850.
Routson et al., Paper No. SPE 3992, (1972).
Needham et al., SPE 4747 (1974).
Zaitoun et al., SPE 18085, (1988).
Zaitoun et al., SPE 18501, (1989).
Avery et al., SPE 18201, (1988).

Primary Examiner—George A. Suchfield
Attorney, Agent, or Firm—Gregory F. Wirzbicki; Shlomo R. Frieman

[57] ABSTRACT

Gels containing gas precursors and/or pathways are used to selectively reduce the flow of aqueous fluids with respect to the flow of nonaqueous fluids to enhance the recovery of the nonaqueous fluids from subterranean formations. The gels, while stable at reservoir conditions, are also readily degraded by gel degrading agents such as acids and therefore are also employed as fail-safe gels in subterranean gel treatments. In another embodiment, selective permeability is restored to a previously treated well by injecting a gas into the previous treated portions of the subterranean formation to displace any aqueous fluid obstructing the passage of the nonaqueous fluid through the polymer-coated pores or gel.

30 Claims, 2 Drawing Sheets

U.S. PATENT DOCUMENTS

| | | | |
|---|---|---|---|
| 4,524,828 | 6/1985 | Sabins et al. | 166/293 |
| 4,534,412 | 8/1985 | Dovan et al. | 166/295 |
| 4,541,488 | 9/1985 | Gömöry et al. | 166/307 |
| 4,569,393 | 2/1986 | Bruning et al. | 166/270 |
| 4,572,295 | 2/1986 | Walley | 166/295 |
| 4,579,670 | 4/1986 | Payne | 252/8.551 |
| 4,643,255 | 2/1987 | Sandiford | 166/295 |
| 4,664,194 | 5/1987 | Marrocco | 166/295 |
| 4,678,032 | 7/1987 | Shu | 166/295 |
| 4,683,949 | 8/1987 | Sydansk et al. | 166/270 |
| 4,694,906 | 9/1987 | Hutchins et al. | 166/294 |
| 4,732,213 | 3/1988 | Bennett et al. | 166/292 |
| 4,776,398 | 10/1988 | Chu et al. | 166/274 |
| 4,779,680 | 10/1988 | Sydansk | 166/300 |
| 4,787,451 | 11/1988 | Mitchell | 166/270 |
| 4,796,700 | 1/1989 | Sandiford et al. | 166/270 |
| 4,815,537 | 3/1989 | Jones | 166/270 |
| 4,821,802 | 4/1989 | Meltz et al. | 166/270 |
| 4,842,071 | 6/1989 | Zaitoun et al. | 166/295 |
| 4,844,163 | 7/1989 | Hazlett et al. | 166/270 |
| 4,896,723 | 1/1990 | Hoskin et al. | 166/272 |
| 4,899,818 | 2/1990 | Jennings et al. | 166/270 |
| 4,901,795 | 2/1990 | Phelps | 166/270 |
| 4,901,797 | 2/1990 | Summers et al. | 166/292 |
| 4,903,767 | 2/1990 | Shu et al. | 166/270 |
| 4,941,533 | 7/1990 | Buller et al. | 166/270 |
| 5,010,954 | 4/1991 | Falk | 166/295 |

METHOD FOR SELECTIVELY REDUCING SUBTERRANEAN WATER PERMEABILITY

BACKGROUND

The present invention relates to (a) methods for selectively reducing subterranean water permeability, (b) subterranean formations containing compositions for selectively reducing subterranean water permeability, (c) methods for degrading a crosslinked polymer in a subterranean formation, and (d) enhanced oil recovery techniques.

During the life cycle of a hydrocarbon producing well, e.g., a well for extracting oil or natural gas from the earth, the producing well commonly also yields water. In these instances, the amount of water produced from the well tends to increase over time, with a concomitant reduction in hydrocarbon production. Frequently, the production of water becomes so profuse that remedial measures have to be taken to decrease the water/hydrocarbon production ratio or, as a last resort, the well is closed in because it has completely stopped producing hydrocarbons or the production of hydrocarbons has become uneconomical.

Some of the remedial measures used to enhance the recovery of hydrocarbons from these wells entail injecting polymers into portions of the subterranean formation to plug off water producing zones within the formation. Unfortunately, not all of these remedial measures are successful and, in some cases, the injected polymer actually further impairs the recovery of hydrocarbons from the treated well. Even in cases where the polymer treatment does initially reduce the water/hydrocarbon production ratio, very commonly this ratio generally increases over time until the well again requires a remedial treatment.

In addition, many enhanced oil recovery projects (e.g., miscible floods (such as carbon dioxide and hydrocarbon (e.g., propane, butane, and pentane enhanced natural gas) miscible floods), steam floods, fire floods (also know as in situ combustion), and immiscible floods (such as nitrogen, flue gas, and carbon dioxide immiscible floods) inject a gas through an injection well in an attempt to increase the recovery of oil from producing wells. Because gases tend to override and/or flow through the most gas-permeable zones of the subterranean formation, various formation zones remain virtually untouched by the injected gas. Although attempts have been made to employ polymers in a few of these enhanced oil recovery techniques to divert the injected fluid to other parts of the subterranean formation, these injected polymers, while being effective for blocking the flow of fluids through the more permeable portion of the formation, also substantially prevent the passage of any gas or liquid through the blocked zones. Accordingly, the use of polymers to block the more permeable zones of a subterranean formation makes it very difficult or virtually impossible for the enhanced oil recovery technique to recover any additional residual oil remaining in the blocked zones of the formation.

SUMMARY OF THE INVENTION

The present invention provides a method for selectively reducing the flow of an aqueous fluid (e.g., water) with respect to the flow of a nonaqueous fluid (e.g., oil, natural gas) in a subterranean formation. In one version of the invention a composition comprising (a) an ingredient capable of transforming the composition into a gel and (b) either (i) a gas precursor and/or (ii) an acid precursor is injected into at least a portion of the subterranean formation. The composition is allowed to form the gel, and the gas precursor and/or acid precursor are subjected to conditions that transform at least a portion of the gas precursor into a gas and/or the acid precursor into an acid, respectively. The generated gas or acid either forms or aids in forming pathways in the gel.

In a modified embodiment of the above version of the invention, the composition need not contain any gas precursor or acid precursor. In this embodiment, at least a portion of the pathways are formed by injecting a gas into at least a portion of the composition.

The presence of the pathways in all the above embodiments enhances the flow of hydrocarbons, especially gaseous hydrocarbons, in preference to water through the gel. Accordingly, the treated well typically has a substantially reduced water/hydrocarbon production ratio.

Another version of the invention entails injecting into at least a portion of a subterranean formation an ingredient capable of forming a polymer-based coating on at least a portion of the surface of the formation. The coating is then formed and a gas is injected proximate at least a portion of the coated surface area. The presence of the gas proximate the coated surface also helps increase the flow of hydrocarbons with respect to the flow of water.

The present invention additionally provides for remedially treating hydrocarbon producing wells using rehealable gels. In this version of the invention, a gel containing either a gas precursor and/or acid precursor or substantially devoid of a gas precursor and an acid precursor is injected into at least a portion of a subterranean formation under conditions that shear at least a portion of the gel. When present, the gas precursor and/or acid precursor is subjected to conditions that convert at least a portion of the precursor into a gas or an acid, respectively. The generated gas and/or acid forms or aids in forming pathways within the gel as the gel heals or after it heals. Alternatively, at least a portion of the pathways are formed by injecting a gas into the sheared gel during the healing period. Similarly to the initial version mentioned above, the presence of the pathways enhances the flow of hydrocarbons through the healed gel, with the treated well typically having a substantially reduced water/hydrocarbon production ratio.

The present invention also provides a recovery system comprising (a) a subterranean formation, (b) a well penetrating at least a portion of the subterranean formation, and (c) a gel or polymer-based coating formed by any of the above versions of the invention present in at least a portion of the subterranean formation.

Furthermore, where a hydrocarbon well has been remedially treated with a polymer and the water/hydrocarbon production ratio has returned to an unacceptable level, a procedure is provided by the present invention for again reducing the water/hydrocarbon production ratio. Specifically, in this embodiment of the invention, a gas is injected into at least a portion of the subterranean formation. The injected gas displaces at least a portion of an aqueous fluid obstructing the passage of the nonaqueous fluid through the polymer-coated or gel-containing pores and restores the preferential flow of hydrocarbons through these pores.

For those situations where a polymer remedial treatment is detrimental to the production of hydrocarbons, the invention also provides a method for efficiently reversing the adverse effects of the polymer. In particular, to effectively remove a problematic gel, the gel-forming composition initially injected in the remedial treatment is formulated to also comprise a gas precursor. If the desired result is not achieved after the composition forms the gel, an acid is injected into the formation to degrade the gel and restore the flow rate of a fluid through the formation. The fluid flow rate is restored by the process of the present invention much more effectively in comparison to an analogous process where the sole significant difference is the substantial absence of any gas precursor in the injected gel-forming composition.

In accordance with the present invention, the vertical gas permeability profile of a subterranean formation is conformed prior to or during the performance of an enhanced oil recovery technique. The vertical conformation procedure of the invention entails injecting a composition through an injection well and into the formation, the composition being capable of forming a gel that selectively permits the passage of a gas while inhibiting the passage of aqueous liquids. The particular gas (e.g., carbon dioxide, steam, organic vapor) introduced during the enhanced oil recovery process tends (a) to be distributed by the gas-permeable polymer more uniformly along the vertical profile of the subterranean formation and (b), after passing through the gel, to more uniformly sweep through the formation.

DRAWINGS

The selective reduction of water/hydrocarbon production ratios achievable using the methods of the present invention as well as other features, aspects, and advantages will become better understood with reference to the following description, appended claims, and accompanying drawings where:

FIG. 1 is a graph of the results obtained by experimentally treating a gas well using the polymer remedial treatment described below in Example 1; and FIG. 2 is a graph of the results obtained when a gas well was experimentally treated by the polymer remedial treatment detailed in Example 2, infra.

DETAILED DESCRIPTION OF THE INVENTION

Figure 1:
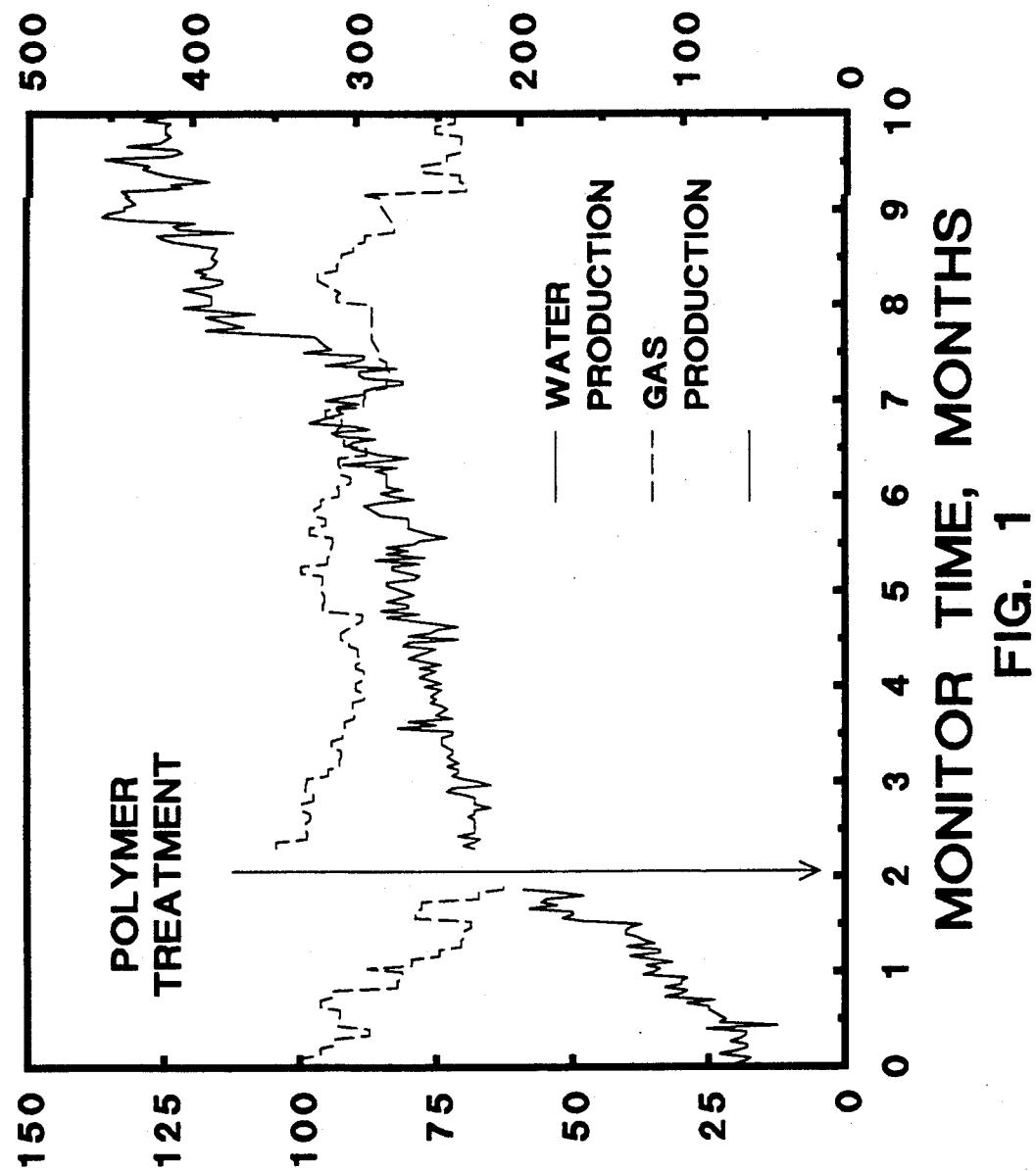

A. Selective Reduction of Water/Hydrocarbon Production Ratio

One aspect of the present invention entails methods for selectively reducing the flow of an aqueous fluid with respect to the flow of a nonaqueous fluid in a subterranean formation. Exemplary aqueous fluids include ground water, reservoir connate water, brine, and aqueous-based fluids injected as part of various enhanced oil and gas recovery techniques. The nonaqueous fluids include, but are not necessarily limited to, liquid hydrocarbons (e.g., oil), gaseous hydrocarbons (e.g., natural gas), carbon dioxide, helium, hydrogen, and hydrogen sulfide.

In one selective reduction method embodying features of the invention, a composition comprising (a) a gas precursor and (b) an ingredient capable of transforming the composition into a gel is injected through a production well and into at least a portion of a subterranean formation. The composition is allowed to form the gel, and the gas precursor is subjected to conditions that transform at least a portion of the gas precursor into a gas.

Preferably, gas precursor are substances selected from the group consisting of (a) materials capable of decomposing into a gas at a temperature less than about 300° C. and/or (b) materials capable of decomposing into a gas at a pH of about 3 to about 11. Preferably, temperature-activated gas precursors decompose into a gas at a temperature less than about 200° C., and more preferably at a temperature less than about 150° C.

Typical gas precursors include, but are not necessarily limited to, ammonium and alkali metal salts of bicarbonates, bisulfates, carbonates, sulfides, bisulfides, and sulfites; thioacetamide; urea; substituted ureas; and mixtures thereof. Preferably, the gas precursor is selected from the group consisting of ammonium bicarbonate, ammonium bisulfite, ammonium sulfite, potassium bicarbonate, potassium bisulfite, potassium sulfite, potassium sulfide, potassium bisulfide, sodium bicarbonate, sodium bisulfite, sodium sulfide, sodium bisulfide, thioacetamide, urea, thiourea, and mixtures thereof. Ammonium bicarbonate, potassium bicarbonate, sodium bicarbonate, and mixtures thereof are the more preferred gas precursors. However, to avoid damaging formation permeability, it is very desirable to employ the ammonium and potassium salts when treating formations containing water reactive clays.

In general, the gel-forming composition comprises a sufficient concentration of the gas precursor to supersaturate the gel with gas upon decomposition of the gas precursor. However, it is preferred that the concentration of the gas precursor in the composition be sufficient to establish a separate gas phase within the gel when the gas precursor decomposes. The concentration of gas precursor necessary to supply sufficient gas to achieve either of the above results depends upon the temperature and pressure of the subterranean formation in which the composition is injected. Ordinarily, a subterranean formation treated in accordance with the invention has a temperature of at least about 15° C. and a pressure greater than about 1 atm. More typically, the formation temperature is about 15° to about 275° C. and very commonly about 50° to about 150° C. The formation pressure frequently tends to be about 3 to about 700 atm and is even more often about 5 to about 200 atm.

Usually, the gas precursor concentration necessary to achieve the above goals decreases with increasing formation temperature, but increases with increasing formation pressure. As a result of the temperature and pressure conditions in the formation, the gel-forming composition frequently comprises about 0.01 to about 10, preferably about 0.05 to about 5, and more preferably about 0.5 to about 2, weight percent gas precursor based upon the total weight of the gel-forming composition. The concentration of the gas precursor is commonly greater than about 1, even greater than about 1.5, as well as greater than about 2, and indeed greater than about 3, weight percent based upon the total weight of the gel-forming composition.

As used in the specification and claims the term "gel" means a substance selected from the group consisting of (a) colloids in which the dispersed phase has combined with the continuous phase to produce a viscous, jelly-like product, (b) crosslinked polymers, and (c) mixtures thereof. Many gel-forming ingredients have been used by those skilled in the art to treat subterranean formations. For example, ingredients which form colloidal gels are noted in U.S. Pat. Nos. 3,687,200 and 4,732,213, these patents being incorporated herein in their entirety by reference. Silicates, colloidal silicas, as well as their ammonium and alkali metal salts are the more common colloidal gel-forming ingredients.

Exemplary crosslinked polymer forming ingredients are discussed in U.S. Pat. Nos. 3,306,870, 3,727,687, 3,740,360, 3,749,172, 3,749,174, 3,782,467, 3,785,437, 3,818,998, 3,881,552, 3,897,827, 3,908,760, 3,921,733, 3,926,258, 3,971,440, 3,978,928, 4,018,286, 4,040,484, 4,074,757, 4,110,230, 4,290,485, 4,413,680, 4,460,751, 4,464,270, 4,470,915, 4,494,606, 4,498,539, 4,502,967, 4,534,412, 4,572,295, 4,579,670, 4,643,255, 4,664,194, 4,667,032, 4,683,949, 4,694,906, 4,776,398, 4,779,680, 4,787,451, 4,796,700, 4,821,802, 4,896,723, SPE 18201, and SPE 3992, these documents being incorporated herein in their entirety by reference.

A crosslinked polymer is generally formed by reacting or contacting proper proportions of a crosslinkable polymer with a crosslinking agent. However, the gel-forming composition need only contain either the crosslinkable polymer or the crosslinking agent. When the crosslinkable polymer or crosslinking agent is omitted from the composition, the omitted material is usually introduced into the subterranean formation as a separate slug, either before, after, or simultaneously with the introduction of the gel-forming composition. Preferably, the composition comprises at least the crosslinkable polymer or monomers capable of polymerizing to form a crosslinkable polymer (e.g., acrylamide, vinyl acetate, acrylic acid, vinyl alcohol, methacrylamide, ethylene oxide, propylene oxide, and vinyl pyrrolidone). More preferably, the composition comprises both (a) the crosslinking agent and (b) either (i) the crosslinkable polymer or (ii) the polymerizable monomers capable of forming a crosslinkable polymer.

Typically, the crosslinkable polymer is water soluble. Common classes of water soluble crosslinkable polymers include polyvinyl polymers, polymethacrylamides, cellulose ethers, polysaccharides, lignosulfonates, ammonium salts thereof, alkali metal salts thereof, as well as alkaline earth salts of lignosulfonates. Specific examples of typical water soluble polymers are acrylic acid-acrylamide copolymers, acrylic acid-methacrylamide copolymers, polyacrylamides, partially hydrolyzed polyacrylamides, partially hydrolyzed polymethacrylamides, polyvinyl alcohol, polyvinyl acetate, polyvinyl pyrrolidone, polyalkyleneoxides, carboxycelluloses, carboxyalkylhydroxyethyl celluloses, hydroxyethylcellulose, galactomannans (e.g., guar gum), substituted galactomannans (e.g., hydroxypropyl guar), heteropolysaccharides obtained by the fermentation of starch-derived sugar (e.g., xanthan gum), and ammonium and alkali metal salts thereof. Preferred water soluble crosslinkable polymers include hydroxypropyl guar, partially hydrolyzed polyacrylamides, xanthan gum, polyvinyl alcohol, and the ammonium and alkali metal salts thereof.

The crosslinkable polymer is available in several forms such as a water solution or broth, a gel log solution, a dried powder, and a hydrocarbon emulsion or dispersion. As is well known to those skilled in the art, different types of equipment are employed to handle these different forms of crosslinkable polymers.

With respect to the crosslinking agents, these agents are organic and inorganic compounds well known to those skilled in the art. Exemplary organic crosslinking agents include, but are not limited to, aldehydes, dialdehydes, phenols, substituted phenols, and ethers. Phenol, resorcinol, glutaraldehyde, catechol, formaldehyde, and divinylether are some of the more typical organic crosslinking agents. Typical inorganic crosslinking agents are polyvalent metals, chelated polyvalent metals, and compounds capable of yielding polyvalent metals. Some of the more common inorganic crosslinking agents include chromium salts, aluminates, gallates, dichromates, titanium chelates, aluminum citrate, chromium citrate, chromium acetate, and chromium propionate.

Techniques for forming gelable compositions and conditions under which such compositions form gels in subterranean formations are well known to those skilled in the art, are discussed in the above incorporated documents, and need not be elaborated upon herein. In general, the gel-forming compositions are formed by mixing in an aqueous media (such as water or brine) about 0.5 to about 50 weight percent polymer, about 0.0001 to about 1 weight percent crosslinking agent, and a sufficient amount of the gas precursor to obtain the above-discussed gas precursor concentration. As known to those skilled in the art, the exact amounts of polymer and crosslinking agent are selected to assure (a) gel stability at reservoir (i.e., subterranean) conditions and (b) a suitable time frame for injecting the composition prior to gelation.

In a preferred embodiment of the present invention, at least a portion of the gas precursor is transformed into the gas during the gelation period (i.e., while the injected composition forms a gel) within the formation. It is usually even more preferred to transform substantially all of the gas precursor into the gas during the gelation period.

Because, as mentioned above, there are different types of gas precursors, there are also different techniques for converting the gas precursor into the gas. One conversion technique entails employing a temperature-activated gas precursor that simply decomposes into a gas at the temperature of the subterranean formation being treated. Another gas precursor conversion technique requires the use of a delayed acting substance and subsequently modifying at least a portion of the delayed acting substance to form an active material that transforms at least some, and preferably substantially all, of the gas precursor into the gas. While the delayed acting substance can be injected into the formation as part of a separate injection slug, preferably the delayed acting substance is also incorporated into the gel-forming composition.

Delayed acting substances include, but are not limited to, delayed acting pH modifying agents, such as acid precursors and base precursors, which generally either hydrolyze or thermally decompose to form an acid or a base, respectively. Typical classes of acid precursors include hydrolyzable esters, acid anhydrides, sulfonates, organic halides, and salts of a strong acid and a weak base. Exemplary specific acid precursors are ethyl formate, propyl formate, ethyl acetate, glycerol monoacetate, acetin, glycerol diacetate, diacetin, xanthanes, thiocyanates, polyethylene esters, ethyl acetate esters, acrylate copolymers, and dimethyl esters. Ethyl formate, propyl formate, ethyl acetate, dibasic esters, and their mixtures are the preferred acid precursors. The more widely known base precursor classes are ammonium salts, quaternary ammonium salts, urea, substituted ureas, coordinated compounds, and salts of a strong base and a weak acid, with the preferred base precursors being urea, thiourea, ammonium chloride, and mixtures thereof.

The concentration of the delayed acting substance in the gel-forming composition is preferably sufficient to transform some, and more preferably substantially all, of the gas precursor into the gas. For example, the concentration of the delayed acting pH modifying agent in the composition is preferably sufficient to change the pH of the composition by at least about 0.5 units. In some cases it is further preferred that the delayed acting pH modifying agent concentration be sufficient to change the pH of the composition by one or more pH units. Based upon the total weight of the gel-forming composition, the delayed pH modifying agent is usually present in a concentration of about 0.05 to about 5 weight percent. Preferably, the concentration of the delayed acting pH modifying agent, based upon the total weight of the composition, is about 0.2 to about 2, and more preferably about 0.5 to about 1.5, weight percent. When a delayed acting substance is employed, it is generally added to the gel-forming composition while mixing the polymer and crosslinking agent in the aqueous media.

In a particularly preferred embodiment of the invention, in addition to generating gas by the decomposition of the gas precursor, one or more slugs of a gas are also injected into the subterranean formation. While the gas slugs are injectable before, during, or after the injection of the gel-forming composition, it is preferred to inject at least some, and more preferentially all, of these slugs simultaneously during the injection of the composition. Also preferred is the alternate, sequential injection of one or more slugs of the gel-forming composition and one or more slugs of the gas. It is even more preferred to inject the gas slugs into the composition during the gelation period and before the composition has formed a gel incapable of being penetrated by the gas at normal gas injection pressures. Normal gas injection pressures are injection pressures less than the formation fracturing pressure.

The amount of gas injected (when measured at the temperature and pressure conditions in the subterranean formation being treated) is generally about 5 to about 95 volume percent based upon the total volume of treatment fluids injected into the subterranean formation (i.e., the sum of the volume of injected gas plus the volume of injected gel-forming composition). Preferably, the amount of gas injected is about 10 to about 70, and more preferably about 15 to about 50, volume percent based upon the total volume of injected treatment fluids.

The injection of one or more gas slugs is sufficiently effective so that in one version of the invention, discussed in more detail below, the composition injected into the subterranean formation is substantially devoid of a gas precursor.

The injected gas is usually a noncondensable gas. Exemplary noncondensable gases include air, oxygen, hydrogen, noble gases (helium, neon, argon, krypton, xenon, and radon), natural gas, hydrocarbon gases (e.g., methane, ethane), nitrogen, and carbon dioxide. Air, nitrogen, and carbon dioxide are the more preferred noncondensable gases, with nitrogen being the most preferred.

The main purpose of the gas precursor and gas slugs employed in the present invention is to form pathways or passages in or through the gel-forming composition during the gelation period so that gas-containing pathways are present in the gel. These gas-containing pathways preferentially favor or permit the flow of a nonaqueous fluid relative to the flow of an aqueous fluid through the gel. Preferably, the concentration of the gas in the pathways present in the gel is about 0.5 to about 100 volume percent of the pathway pore volume. More preferably, the concentration of the gas in the pathways is about 1 to about 95, and most preferably about 5 to about 90, volume percent of the pathway pore volume.

Another purpose of the gas slugs is to provide the formation with a sufficient amount of gas so that, when the well is reopened for production, gas is immediately produced from the well without the need to swab, suction, or otherwise prime the well. In short, the gas introduced by the gas slugs also acts to "self-prime" the well.

The delayed acting substances discussed above for use in conjunction with activating the gas precursor also form or aid in forming the pathways. Accordingly, in addition to forming pathways with delayed acting substances in combination with gas precursors, the delayed acting substances also are employed to form pathways either by themselves or in conjunction with the use of one or more gas slugs. When the gel-forming composition is substantially devoid of any gas precursor, the delayed acting substance, e.g., the acid precursor, is typically present in the gel-forming composition in a concentration of about 0.2 to about 20, preferably about 0.5 to about 15, and more preferably about 1 to about 10, weight percent based on the total weight of the gel-forming composition. The concentration of the acid precursor in the gel-forming composition in the substantial absence of a gas precursor is commonly greater than about 3, even greater than about 4, as well as greater than about 5, and indeed greater than about 10 weight percent based on the total weight of the gel-forming composition.

When the delayed acting substance is used by itself in the substantial absence of any gas precursor or gas slugs, the delayed acting substance is transformed into its active specie, e.g., acid or base, either during or after the gelation period. However, when the delayed acting substance is employed in conjunction with one or more gas slugs, it is preferred to transform at least part, and more preferably substantially all, of the delayed acting substance to its active specie during the gelation period. In the latter case where gas slugs are employed in conjunction with the use of delayed acting substances to form the pathways, the gas slugs are introduced into the composition in the manner and amount discussed above in connection with the gas precursor-containing composition.

In yet another version of the invention, the gel is contacted with a gel decomposing agent to form the pathways. Exemplary gel decomposing agents include acids (e.g., a Bronsted acid (such as hydrochloric acid, hydrofluoric acid, and acetic acid); a Lewis acid (e.g., aluminum chloride)); oxidizing agents (e.g., peroxides such as hydrogen peroxide); bleaches (e.g., sodium hypochlorite); persulfates (e.g., potassium persulfate); and reactive gases. As used in the specification and claims, the term "reactive gases" means gases that form either acidic solutions or basic solutions when contacted with water. Typical acidic reactive gases that form an acidic solution when contacted with water include, but are not limited to, carbon dioxide, hydrogen sulfide, sulfur dioxide, and sulfur trioxide. Common basic reactive gases that form a basic solution when contacted with water include ammonia, methylamine, and ethylamine. The preferred gel decomposing agents are acids.

Liquid gel decomposing agents are generally used in the form of an aqueous solution having a concentration of about 0.5 to about 30, preferably about 1 to about 20, and more preferably about 2 to about 15, weight percent based upon the total weight of the aqueous solution. Typically, the gel is contacted with about 0.05 to about 2 gallons of a solution of the liquid gel decomposing agent per barrel of injected gel-forming composition, with the preferred volume being about 0.1 to about 1.5, and the more preferred volume being about 0.5 to about 1, gallons per barrel of injected gel-forming composition. Contacting the gel with the gel decomposing agent is especially efficacious for forming pathways when a gas precursor is employed in the composition. As discussed below, a modified embodiment of the liquid gel decomposing agent version is very suitable for removing fluid impedance due to the presence of the gel in the formation.

When reactive gases are employed, they are commonly used in a concentrated form. Their dissolution in aqueous fluids is dependant upon the particular reactive gas and the temperature and the pressure of the subterranean formation. Each reactive gas is preferably employed in a concentration at about or greater than its solubility limit at the formation temperature and pressure For example, carbon dioxide solubility is about 35 cc per gram of water at about 120° F. and about 2,000 psi, while at about 180° F. and about 2,000 psi the solubility decreases to about 25 cc per gram of water. Accordingly, at about 120° F. and about 2,000 psi carbon dioxide is preferably employed in a concentration at least about 35 cc per gram of water in the gel, while at about 180° F. and about 2,000 psi carbon dioxide is preferably employed in a concentration at least about 25 cc per gram of water in the gel.

In a further version of the present invention for selectively reducing the aqueous/nonaqueous production ratio, a rehealable gel is employed to selectively reduce the flow of the aqueous fluid with respect to the flow of the nonaqueous fluid in a subterranean formation. Rehealable gels suitable for use in this version of the invention are well known to those skilled in the art. See, for example, U.S. Pat. Nos. 4,464,270, 4,470,915, 4,502,967, 4,579,670, 4,779,680, and 4,901,795, these patents being incorporated herein in their entirety by reference. Chromium crosslinked xanthan biopolymers are one example of a rehealable gel.

In this version of the invention the rehealable gel is injected into at least a portion of the subterranean formation under conditions that shear at least a portion of the gel. In some of the embodiments of this version of the invention, the rehealable gels are modified to contain a gas precursor, an acid precursor, or a mixture of these precursors. In these embodiments, the sheared gel is allowed to heal and the gas precursor and/or acid precursor contained in the gel is subjected to conditions that transform at least a portion of the gas precursor and/or acid precursor into a gas or an acid, respectively. Preferably, the gas precursor is transformed to the gas as the gel reheals. In other words, it is preferred that the transformation of the gas precursor occur while the gel is at least partially in a sheared state. When the acid precursor is employed alone, the acid precursor preferably is transformed into an acid after the gel reheals. However, when the acid precursor is employed together with the gas precursor as the means for transforming the gas precursor into a gas, it is preferred that the acid precursor be transformed into an acid during the gel healing period in order to liberate the gas which, in turn, forms gas-containing passages as the gel reheals.

Optionally, one or more slugs of gas are also injected into the sheared gel to aid in forming passageways therein. The amount of gas injected (when measured at the temperature and pressure conditions in the subterranean formation being treated) is generally about 5 to about 95 volume percent based upon the total volume of treatment fluids injected into the subterranean formation (i.e., the sum of the volume of injected gas plus the volume of injected rehealable gel). Preferably, the amount of gas injected is about 10 to about 70, and more preferably about 15 to about 50, volume percent based upon the total volume of injected treatment fluids.

In another embodiment of the invention, the gel-forming composition or rehealable gel injected into the subterranean formation is substantially devoid of any gas precursors or any delayed acting substance. In this version, slugs of gas are injected into at least a portion of either (a) the gel-forming composition prior to its forming a gel or (b) the sheared gel to form pathways therein. These pathways or modified versions thereof are respectively present in the formed gel or in the rehealed gel. The respective volume percents of gas mentioned above in connection with the gel-forming compositions and in the preceding paragraph in regards to the rehealable gels are also employed in this embodiment of the invention.

Gas slugs are also used in a different version of the invention in conjunction with a composition that only forms a polymer-based coating on at least a portion of the surface area of the subterranean formation. These polymer-based coating forming compositions are well know to those skilled in the art. Exemplary coating forming compositions are detailed in U.S. Pat. No. 4,842,071, SPE 4747, SPE 18085, SPE 18501, and Zaitoun et al., Proceedings of the Fourth Eur. Symp. on EOR, Hamburg, October 27-29, 1987, pp. 839-850, these documents being incorporated herein in their entirety by this reference. Typically, the coating forming compositions are formed by mixing about 0.05 to about 1 weight percent polymer in an aqueous media (e.g., water or brine).

The method of this version of the invention entails injecting the coating forming composition into at least a portion of the subterranean formation to form a polymer-based coating on at least a portion of the surface area of the formation. One or more slugs of gas are injected into at least a portion of the subterranean formation and proximate at least a portion of the coated surface area. While the gas slugs can be injected either before, during, or after the injection of the coating forming composition, preferably the gas slugs are injected during or after the injection of the coating forming composition. It is also preferred to inject a plurality of sequential coating forming compositions and gas slugs. The concentration of gas in at least some, and preferably substantially all, of these pathways is generally sufficient to allow gas flow. Preferably, the gas concentration in these pathways is about 0.5 to about 100, more preferably about 1 to about 95, and most preferably about 5 to about 90 volume percent of the pathway pore space.

To achieve the desired gas concentration in the pathways, the amount of gas injected (when measured at the temperature and pressure conditions in the subterranean formation being treated) is generally about 5 to about 95 volume percent based upon the total volume of treatment fluids injected into the subterranean formation (i.e., the sum of the volume of injected gas plus the volume of injected coating forming composition). Preferably, the amount of gas injected is about 10 to about 70, and more preferably about 15 to about 50, volume percent based upon the total volume of injected treatment fluids.

One exemplary process for practicing the present invention is as follows. Before mixing any chemicals into the water employed in making the gel-forming composition, the water is generally filtered to prevent any suspended solids from damaging the formation by plugging the wellbore. Typically, the first chemicals added to the water are any required salts such as potassium or calcium chloride and gas precursors such as potassium or ammonium bicarbonate. Salts are generally employed to prevent clay problems in the formation and/or to help stabilize the gel.

In order for the polymer to experience a high degree of turbulence during the initial mixing stage, solid polymers and liquid-based polymers are usually added to the water through an eductor or a positive displacement pump, respectively. The polymer and water are typically mixed in a mixing tank in small 10 to 25 barrel batches. When desired, further mixing is achieved using either centrifugal pumps or other forms of agitation.

Once the polymer is completely mixed into the water, the acid precursor (e.g., dibasic ether or ethyl formate), when employed, is added to the water-polymer containing mixing tank. Frequently, the last chemical to be added to the mixing tank is the crosslinking agent (e.g., aluminate or chromium acetate). When used in a solid form, the crosslinking agent is commonly first dissolved in water in order for it to more readily mix with the contents of the mixing tank. This is especially very important when the contents of the mixing tank are very viscous.

The gel-forming composition is obtained when all the desired ingredients have been mixed in the mixing tank. The resulting gel-forming composition is then often injected into the subterranean formation through a production well at a pressure below the fracture pressure of the formation. Depending on the injection capabilities of the well, the first slug of the gel-forming composition generally varies from about 25 to about 100 barrels. Next, the injection of gel-forming composition is stopped and a noncondensable gas such as nitrogen is injected into the production well to physically force gas fingers through the gel-forming composition, thereby creating gas-containing pathways through the gel-forming composition. The volume of the nitrogen slug (based upon the temperature and pressure conditions within the formation being treated) is typically about 25 percent of the volume of the previously injected slug of gel-forming composition volume. The alternating slugs of gel-forming composition and nitrogen are then repeated to achieve the desired penetration depth into the formation. The volume of the final nitrogen slug is preferably large enough to over-displace the wellbore of any gel-forming composition.

The gel-forming composition is displaced into the formation a sufficient distance so that at least a portion of the pore space in the formation, typically at least about 3 feet from the production well or point of injection, is occupied by the composition. Preferably, the gel-forming composition occupies at least a portion of the pores located at least about 15 feet from the well. More preferably, at least some of the pores located at least about 30 feet from the production well contain the composition.

The well is then shut in for a sufficient period of time to allow the gel-forming composition within the pores of the subterranean formation to gel. A procedure analogous to that stated above is also used when treating the formation with either a polymer-based coating forming solution or a rehealable gel.

The well is then slowly put back on production following the shut in period. However, if the gel or polymer-based coating or rehealed gel has reduced the formation permeability beyond an acceptable amount, the well is then commonly acidified to remove portions of the gel or polymer-based coating or rehealed gel, respectively. The acid treatment generally also creates additional gas pathways in the gel or rehealed gel and thereby selectively increases the gas permeability of the formation.

An exemplary acid treatment consists of injecting an acid, such as hydrochloric acid, into the production well at a concentration of about 2 to about 10 weight percent. Alternatively, the acid is optionally allowed to flow into the formation under a hydrostatic head. The acid is allowed to soak for about 24 hours and is then swabbed, jetted, or flushed out of the wellbore. The jetting action is usually accomplished by injecting nitrogen via coiled tubing to gas lift the acid in the well.

Once the acid is removed along with the degraded gel or polymer-based coating or rehealed gel, the well typically is capable of flowing at a higher rate. However, if the well does not respond after the first acid treatment, the acid treatment is repeated until a sufficient amount of the gel or polymer-based coating or rehealed gel has been removed to allow the well to return to production.

The treatment process of the present invention is also applicable to treating subterranean formations having a plurality of zones of differing permeabilities. In one version for treating such a combination of subterranean zones, the zone of greatest permeability is selectively plugged by a three step process. In the first step, a temporary gel containing a delayed gel breaking ingredient is injected into the formation through the production well to block the pores of the less permeable zones. The second step comprises treating the zone of greatest permeability to form a more permanent selective plug, penetrating deeper into this more permeable zone, using one of the above described techniques for either forming gels, polymer-based coatings, or rehealed gels. The temporary plug is then removed (e.g., by internal degradation), restoring flow to the less permeable zones while maintaining the deeper plug in the more permeable zone.

Another version for treating subterranean zones having differing permeabilities entails treating the various zones using one of the above described methods of the present invention. Because the composition tends to enter into the zone of greatest permeability, the resulting gel, polymer-based coating, or rehealed gel penetrates deeper into the greatest permeability zone and penetrates less deeply into the zones of lesser permeability. Accordingly, the thinner layer of gel, polymer-based coating, or rehealed gel present in the zones of lesser permeability are removed, e.g., by acid or bleached treatment, and fluid flow is restored to these less permeable zones.

B. Restoring Selective Permeability

After a production well has been treated with a prior art technique for selectively reducing the subterranean water permeability, the water/hydrocarbon production ratio tends to increase over time and eventually reaches a level where further remedial treatment is required. The present invention also provides an elegant method for readily reducing the water/hydrocarbon production ratio in wells previously treated to selectively reduce this ratio. In particular, in accordance with the selective permeability restoration method of this invention, a gas is injected into at least a portion, and preferably substantially all, of the previous treated portions of the subterranean formation to displace at least a portion of an aqueous fluid obstructing the passage of the oil, natural gas, or other nonaqueous fluid through the polymer-coated pores or gel (whether rehealed or not). Preferably, substantially all of the obstructing aqueous fluid is displaced from the polymer-coated pores or gel. The amount of gas injected is dependant upon the pore volume of aqueous fluid present in the previously treated formation at the time the presently considered remedial treatment is being conducted. In general, the volume of gas injected is at least about 50 percent (at the pressure and temperature conditions of the formation) of the available pore space within the treated portion of the formation. As used in the specification and claims, the term "available pore space" means the net pore space within the treated portion not occupied by any polymer-based coating or gel. In the case of gels, the available pore space equals the total volume of pathways or passages within the gel. Preferably, the volume of injected gas is at least about 100 percent, more preferably at least about 150 percent, and most preferably at least 200 percent, of the available pore space within the treated portion of the formation. Because of economical considerations, very rarely is more gas than about 1,000 percent of the available pore space injected into the formation.

C. Gel Degradation Technique

As mentioned above, gel decomposing agents are used to decrease the water/hydrocarbon production ratio. In the gel degradation version of this invention, these gel decomposing agents are used to remove substantially all flow impedance caused by the gel in the formation. This modification is accordingly useful for reversing the effect of any undesirable polymer treatment and for substantially restoring the flow rate of a fluid through the formation to the level of fluid flow present before the polymer treatment.

In this version of the invention, the gel decomposing agents are preferably selected from the group consisting of acids, oxidizing agents, and bleaches. The concentration of gel decomposing solutions employed to degrade gels is dependant upon the particular gel decomposing agent used, the gel to be degraded, the formation characteristics, the treatment temperature, and the volume of the prior gel treatment. In general, the concentration of the gel degrading agent solution is about 5 to about 40, and preferably about 10 to about 20, weight percent based on the total weight of the aqueous solution. For example, a 15 weight percent hydrochloric acid solution is sufficient to remove a gel formed from hydroxypropyl guar and titanium.

The volume of the gel degrading agent solution employed in the gel degradation embodiment of the invention is sufficient to substantially remove the impedance to fluid flow caused by the presence of the polymer in the subterranean formation. While the volume of gel degrading agent solution capable of achieving this result may occasionally be as low as 0.5 gallons per barrel of injected gel-forming composition or injected rehealable gel, more typically the volume of gel degrading agent solution used is greater than 1, and preferably greater than 2, gallons per barrel of injected gel-forming composition or injected rehealable gel. Because of economic considerations, the volume of gel degrading agent solution injected is usually less than 10 gallons per barrel of injected gel-forming composition or injected rehealable gel.

Gas slugs, gas precursors, and combinations of gas slugs and gas precursors are used in the gel degradation technique to prepare a gel having pathways present in the gel and/or gels containing gas precursors for aiding the formation of pathways in the gel. The respective volumes and concentrations of gas slugs and gas precursors employed in this version of the invention are the same as mentioned in section A.

In the gel degradation technique of the invention, an acid activated gas precursor (such as a carbonate-containing or bicarbonate-containing gas precursor) is preferably used when the gel degrading agent is an acid; a base activated gas precursor (such as ammonium hydroxide) is preferably used in conjunction with bleach; and a temperature-activated gas precursor (such as urea) is preferably employed when the gel degrading agent is an oxidizing agent.

It is not uncommon in the gel degradation technique of this invention to restore the flow rate through the polymer-containing plugged formation to twice that achievable using substantially the same gel whose sole major difference is the virtual absence of any gas precursor. Furthermore, gas precursor-containing gels treated with a gel degrading agent are capable of yielding flow restoration rates at least 5, 10, 15, and even 20 times better than when a gel degrading agent is used to treat a similar gel substantially devoid of any gas precursor. See, for instance, Example 4 below where the improved flow rate obtained by the process of the present invention was over 25 times better than that achieved using a gel whose sole major difference was the virtual absence of any gas precursor.

D. Enahanced Oil Recovery Applications

In accordance with the present invention, the flow of gas through a formation containing a plurality of zones having different gas permeabilities is redistributed by conforming or making more uniform the vertical gas permeability profile proximate the injection well. Because of the uniform vertical gas permeability profile, the gas injected as part of an enhanced oil recovery procedure tends to move across the formation to the production well in a more evenly distributed or piston-like fashion. Accordingly, the uniform distribution of the gas along the vertical profile of the formation enables the injected gas to contact, and therefore mobilize or recover, more of the oil present in the less permeable formation zones.

To illustrate this embodiment of the invention, prior to or at some time during a miscible flood, steam flood, fire flood, immiscible flood, or other gas injection enhanced oil recovery process, either a gel or a polymer-based coating or a rehealed gel is formed by injecting a gel-forming composition or a polymer-based coating forming composition or a rehealable gel, respectively, into an injection well using any of the techniques disclosed in above section A with respect to treating subterranean formations proximate a production well. The resulting gel or polymer-based coating or rehealed gel yields a selective permeable barrier favoring the flow of gas over the flow of aqueous liquids. Since the entire barrier possesses substantially the same gas permeability, the barrier conforms the vertical permeability profile within the treated portion of the formation. Accordingly, instead of the gas being transported primarily through the most gas-permeable zones of the formation, the gas-permeable barrier causes the gas to more uniformly (a) distribute itself along the vertical length of the treated formation and (b) transverse the horizontal distance between the injection well and production wells.

The enhanced oil recovery techniques of the present invention can be used in conjunction with water alternating gas (WAG) techniques wherein a water slug is employed to act as a barrier to a subsequently injected gas slug in an attempt to redistribute the gas flow through a different formation zone. However, the present invention obviates employing the WAG technique because the gas-permeable barrier makes the less permanent and less gas-permeable water barrier redundant and, in comparison to the gas-permeable barrier used in the present invention, relatively inefficient.

EXAMPLES

The following Examples 1 and 2 illustrate different versions of the present invention for selectively reducing the flow of an aqueous fluid with respect to the flow of a nonaqueous fluid in a subterranean formation. Examples 3-6 are comparative tests illustrating the improved restoration in flow rates obtainable by two embodiments of the invention and Example 7 illustrates an on site test confirming the capacity of this embodiment of the invention to successfully restore a subterranean fluid flow rate. The restoration of selective permeability using a slug of gas to remove materials blocking the passage of a gas through pathways in a gel is demonstrated in Example 8. Exemplary enhanced oil recovery embodiments of the present invention are set forth in Examples 9-10. Lastly, comparative Examples 11-12 demonstrate the improved gel degradation obtainable in accordance with the present invention by incorporating a gas precursor into the gel-forming composition. All of the examples are illustrative only and are not intended to limit the scope of the invention.

EXAMPLE 1

Field Experiment Demonstrating Selective Reduction Of Water/Hydrocarbon Production Ratio Potassium bicarbonate (1400 lbs) was mixed with 300 barrels (bbls) of freshwater and delivered to the well site. Prior to being delivered, the water was filtered through 20-micron size filters. On-site, the water was pumped into a 400 bbl storage tank. The resulting water was then pumped through a 5-micron size basket filter and through an eductor.

The eductor was used to mix hydroxypropyl guar polymer (available from Aqualon) with the water. The resulting mixture was introduced into an agitated mixing tank to which formaldehyde was also added. Table 1 below shows the amount of chemicals added to each batch of polymer solution mixed. After the first batch of polymer composition was mixed, it was transferred to a work tank from where it was injected into the formation being treated. Ethyl formate was added to the composition during the last phase of the treatment. In addition, a 20 weight percent solution of TYZOR 131 brand crosslinking agent (available from DuPont) was mixed in a 100 gallon tank and added to the injection stream at the wellhead with a metering pump.

After the first 100 barrels of the gel-forming composition had been injected into the formation, about 20,000 SCF of nitrogen was then injected into the formation as the alternating gas slug. The gas was designed to finger through the gel-forming composition, creating gas channels. Another slug of about 15,000 SCF of nitrogen was injected following the second (about 85 bbl) slug of the gel-forming composition. After the final gel-forming composition slug (about 81 bbl), the gel-forming composition was displaced from the wellbore and into the formation with about 34,000 SCF of nitrogen. The well was then shut in for about 5 days to allow the gel-forming composition to gel. The injection schedule is also given in Table 1.

As indicated in FIG. 1, which is a graphic representation of the results of this treatment, the treated well produced about twice as much gas and some water in comparison to the production rates prior to the treatment. Furthermore, the water production rate after the treatment also tended to stabilize.

TABLE 1

| Batch No. | Volume (bbls) | Ethyl Formate (lbs) | Crosslinker[a] (lbs) | (ppm) | Polymer[b] (lbs) | HCHO (gals) | KHCO$_3$ (lbs) |
|---|---|---|---|---|---|---|---|
| 1st Composition Slug = 100 bbls; 1st N$_2$ Slug = 20 MSCF[c] | | | | | | | |
| 1 | 50 | 0 | 10.5 | 600 | 70 | 3.5 | 234 |
| 2 | 30 | 0 | 10.5 | 600 | 70 | 3.5 | 234 |
|   | 10 | 37.5 | | | | | |
|   | 10 | 37.5 | | | | | |
| 2nd Composition Slug = 85 bbls; 2nd N$_2$ Slug = 15 MSCF | | | | | | | |
| 3 | 50 | 0 | 10.5 | 600 | 70 | 3.5 | 233 |
| 4 | 10 | 37.5 | 9.8 | 800 | 70 | 3.5 | 233 |
|   | 10 | 37.5 | | | | | |
|   | 10 | 37.5 | | | | | |
|   | 5 | 37.5 | | | | | |
| 3rd Composition Slug = 81 bbls; 3rd N$_2$ Slug = 34 MSCF | | | | | | | |
| 5 | 20 | 0 | 15.2 | 800 | 70 | 3.5 | 233 |
|   | 10 | 37.5 | | | | | |
|   | 10 | 37.5 | | | | | |
|   | 14 | 37.5 | | | | | |
| 6 | 10 | 37.5 | 9.5 | 1000 | 70 | 3.5 | 233 |
|   | 10 | 25.0 | | | | | |

TABLE 1-continued

| Batch No. | Volume (bbls) | Ethyl Formate (lbs) | Crosslinker[a] (lbs) | Crosslinker[a] (ppm) | Polymer[b] (lbs) | HCHO (gals) | KHCO3 (lbs) |
|---|---|---|---|---|---|---|---|
| | 7 | 0 | | | | | |
| Total | 266 | 400 | 66 | | 420 | 21 | 1400 |

[a]TYZOR 131 brand crosslinking agent.
[b]hydroxypropyl guar polymer.
[c]MSCF denotes thousand standard cubic feet.

EXAMPLE 2

Field Experiment Demonstrating Selective Reduction Of Water/Hydrocarbon Production Ratio Excessive water production had killed the production of gas from a gas well and the well had to be shut in. The shut in well was subsequently treated by a process of the present invention to reduce water production so that gas could be produced. The remedial treatment consisted of a 37 barrel dichromate preflush, 634 barrels of a gel-forming composition, and three alternating slugs of nitrogen. The total nitrogen volume injected was 176 MSCF.

More particularly, the preflush was used to condition the subterranean rock surface and to satisfy reservoir rock adsorption requirements. The next stage was a dilution spearhead. This stage was included to assure that the leading edge of the slug of the gel-forming composition would continue to be crosslinkable even after being diluted by connate water. The gel-forming composition employed in this experiment comprised (a) Nalco 9810 brand partially hydrolyzed polyacrylamide (available from Nalco Chemical Co. in an uninverted emulsion form) and a chromium based crosslinking agent. About 66 barrels of poorly inverted gel-forming composition was initially injected, followed sequentially by about 480 barrels of inverted gel-forming composition, and finally about 88 barrels of poorly inverted gel-forming composition. The injection of the poorly inverted gel-forming composition improved permeability selectivity. The injection sequence is shown in Table 2.

TABLE 2

| Stage | Volume bbl | Volume (MCF) | Polymer Condition In Injected Composition |
|---|---|---|---|
| Preflush | 37 | | None Injected |
| Spearhead | 66 | | Poorly Inverted |
| 1st Polymer | 96 | | Inverted |
| 1st Gas Slug | | (36) | — |
| 2nd Polymer | 192 | | Inverted |
| 2nd Gas Slug | | (60) | — |
| 3rd Polymer | 192 | | Inverted |
| Gel Cap | 64 | | Poorly Inverted |
| Disposal | 24 | | Poorly Inverted |
| 3rd Gas Slug | | (80) | — |

Figure 2:
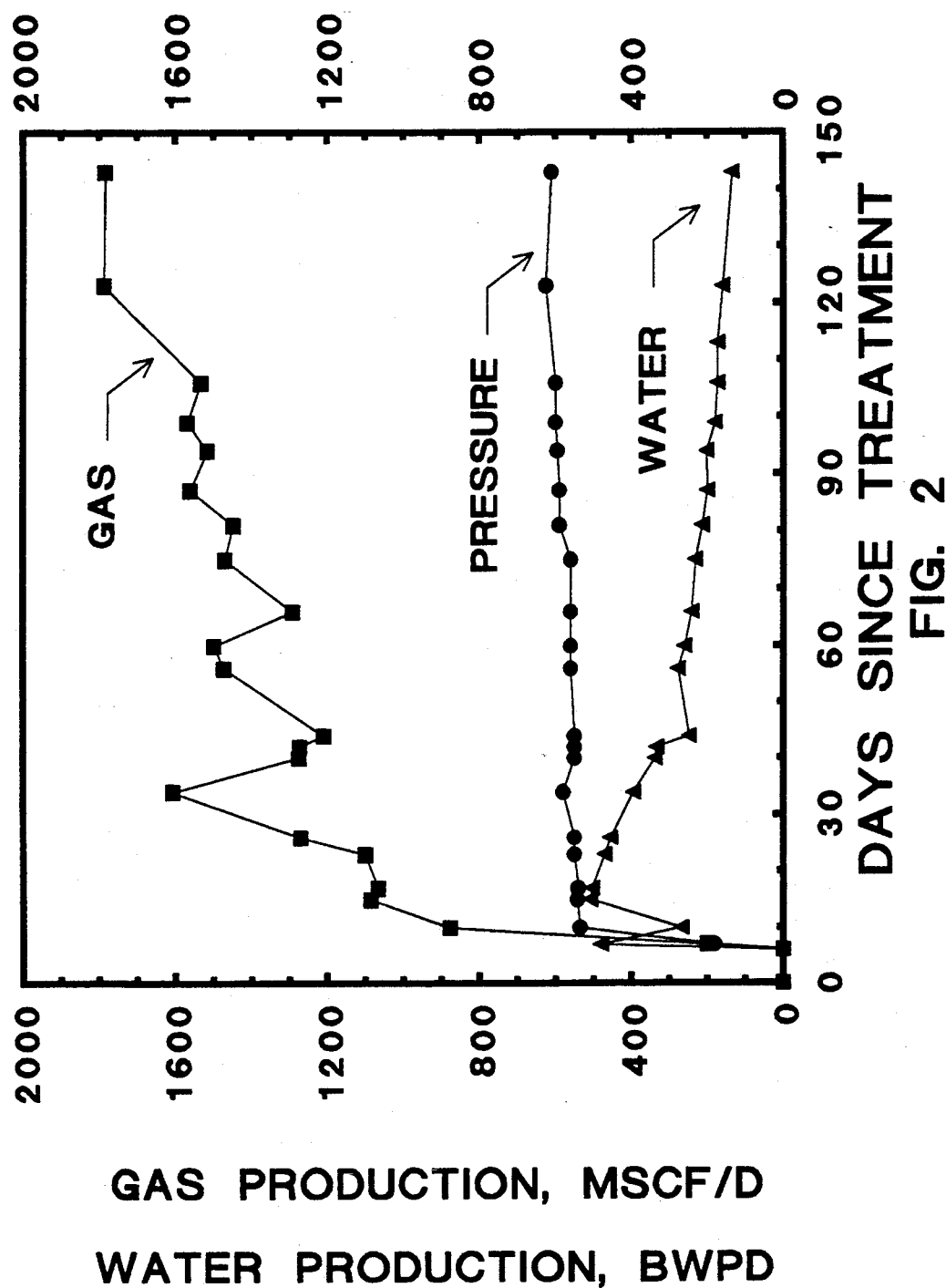

The above sequential treatment resulted in the complete shut off of both gas and water production. A solution containing about 10 weight percent sodium hypochlorite and about 1 weight percent CI-24 brand corrosion inhibitor was used to degrade the uninverted polymer in the well. Following two 20-hour soak periods using about 250 gallons of the sodium hypochlorite solution each, a third 250 gallon slug of sodium hypochlorite was injected followed by about 100 MSCF of nitrogen. The well was then shut in for about one day. When the well was returned to production it exhibited a significant increase in gas production and a significant decrease in water production as illustrated in FIG. 2.

EXAMPLES 3-6

Laboratory Comparative Flow Studies

In Examples 3-5, laboratory flow studies on three polymer gel treatments were conducted using a constant pressure of about 1.6 psi to flow fluids from a storage vessel through a sand pack and into a graduated cylinder. In Examples 3-5, a seven inch long by one inch diameter plastic core holder was packed with acid cleaned beach sand to a porosity of about 40 percent. The bulk volume of the core holder was about 90 ml with a calculated pore volume of about 36 ml.

In Example 6, a 5 inch long by 1.24 inch diameter plastic core holder was packed with a commercial sand having an average particle size of about 135 mesh. The packed column used in Example 6 had a porosity of about 51% and a pore volume of about 58 ml. The laboratory flow study in Example 6 was conducted using a constant pressure of 4 psi to flow fluids from a storage vessel through the sand pack and into a graduated cylinder.

The sequence of flow for each polymer study of Examples 3-6 and the results obtained are set forth in Table 3 below:

TABLE 3

| ACTION | PARAMETER CALCULATED | EX. 3 | EX. 4 | EX. 5[a] | EX. 6 |
|---|---|---|---|---|---|
| Flow water | Initial permeability, $k_i$ | 6,550 | 8,560 | NT[b] | 4,065 |
| Flow polymer | Effective viscosity, $u_{eff}$ | 15 | 160 | NT | NT |
| Flow water | Post polymer permeability, $k_p$ | 5,680 | 610 | 5,615 | NT |
| Inject gel | Gel solution | | | | |
| | Gel, % pore volume | 100.0 | 39.0 | 36.0 | 30.8 |
| | ORP 750 Polymer[c], wt % | 0.2 | 0.4 | 0.4 | 0.4 |
| | Sodium Dichromate, wt % | 0.1 | 0.1 | 0.1 | 0.1 |
| | Sodium Thiosulfate, wt % | 0.3 | — | 0.3 | 0.3 |
| | Sodium metaBisulfite, wt % | — | 0.1 | — | — |
| | Sodium Bicarbonate, wt % | — | 1.0 | — | — |
| | pH | 5.8 | 8.5 | 5.8 | 5.8 |
| Inject gas | | — | — | — | Yes[e] |
| Flow water | Post gel permeability, $k_g$ | 13 | 24 | 0 | 0 |
| | Gel resistance factor, $k_i/k_g$ | 490 | 360 | Plgd[d] | Plgd |
| Flow acid | 6 wt % HCl pore volume, % | 100 | 100 | — | 50 |
| Flow water | Post acid | 71 | 3,210 | Plgd | 20.0 |

TABLE 3-continued

| ACTION | PARAMETER CALCULATED | EX. 3 | EX. 4 | EX. 5[a] | EX. 6 |
|---|---|---|---|---|---|
| | permeability, $k_a$ | | | | |
| | Acid improvement factor, $k_a/k_g$ | 5 | 135 | Plgd | ∞[f] |
| Flow bleach | 5 wt % bleach pore volume, % | NT | 100 | 100 | NT |
| Flow water | Post bleach permeability, $k_b$ | — | 5,615 | 0 | — |
| | Bleach improvement factor, $k_b/k_g$ | — | 236 | Plgd | — |

[a] The sandpack of Example 4 was reused for Example 5.
[b] NT denotes not tested.
[c] ORP 750 polymer is a high molecular weight, very low hydrolysis polyacrylamide available from Dai-Ichi Kogyo Seiyaku Co., Ltd. of Japan.
[d] Plgd means plugged.
[e] There were four sequential gel solution-gas slug injections. Specifically, each injection of the gel solution (about 7.7 percent of the pore volume per gel solution injection) was followed by a gas slug injection (about 7.7 percent of the pore volume per gas slug injection).
[f] The core was no longer plugged.

The data set forth in Table 3 for Examples 3–4 shows that the restored permeability after an acid treatment is much higher when the formation being treated contains a gel comprising a gas precursor. Furthermore, the data of Table 3 also indicates that a gas precursor-containing gel also shows a significant improvement in permeability when treated with bleach. In addition, the data shown in Table 3 regarding Examples 5–6 indicate that the restored permeability after an acid treatment is also much higher when the formation being treated contains a gel having pathways therein formed using injections of gas slugs during the gel formation process.

EXAMPLE 7

Gel Degradation Field Experiment

A summary of the treatment is set forth in Table 4 below. The volume of gel-forming composition injected was about 269 barrels followed by a polymer buffer of about 8 barrels and a water flush of about 23 barrels. The flush was designed to displace the gel-forming composition out of the gravel pack center. The polymer buffer was employed to prevent the water from diluting the gel-forming composition. The gel-forming composition was displaced out of the gravel pack to prevent damage to the completion. In batch 1, the diatomaceous earth filter unit was found to remove the polymer from the solution. Afterwards, only the water was filtered prior to the addition of the polymer. Polymer mixing time was about 30 minutes per 37.5 barrel batch.

About 1.5 weight percent potassium bicarbonate was added to the water prior to mixing the water with the polymer. (One reason for the addition of the potassium bicarbonate to the gel-forming composition was to aid in removing the gel.) The gel-forming composition was successfully injected into the subterranean formation without exceeding the formation pressure and the gel properties were excellent.

Following a 3 day shut in period, the well was swabbed to remove water. No gas or water production resulted indicating that the gel impeded substantially all of the gas and water flow in the formation.

The gel was then subjected to a gel degradation method which consisted of injecting about 1,000 gallons of about 15 weight percent HCl into the subterranean formation. The acid was displaced from the wellbore with nitrogen and shut in overnight. The well was swabbed the next day and production of gas and water commenced. The resulting production is summarized below in Table 5 wherein it is shown that this exemplary gel degradation method of the present invention is capable of removing substantially all fluid impedance cause by the presence of the gel in the subterranean formation.

TABLE 4

Mix Water: 1.5 wt % potassium bicarbonate in tap $H_2O$, pH 8.7
Polymer: 0.3–0.4 wt % hydroxypropyl guar
Formaldehyde: 688 ppm added to all batches
Crosslinking agent: 500–1,000 ppm Tyzor 131 (available from Dupont)
Filtration: Diatomaceous earth filter press followed by 2 micron polishing filter

| Batch | Volume, bbl | Polymer, wt % | Crosslinking agent, ppm |
|---|---|---|---|
| 1 | 40.0 | 0.30 | 500 |
| 2 | 37.5 | 0.38 | 500 |
| 3 | 37.5 | 0.38 | 500 |
| 4 | 37.5 | 0.38 | 600 |
| 5 | 37.5 | 0.38 | 600 |
| 6 | 37.5 | 0.38 | 800 |
| 7 | 37.5 | 0.40 | 1000 |
| 8A | 4.0 | 0.40 | 1000 |
| 8B | 8.0 | 0.40 | 0 |
| 9 | 23.0 | 0 | 0 |

Totals

| | |
|---|---|
| Water Volume | 300 Bbl |
| Polymer | 362 lbs |
| Crosslinking Agent | 71 lbs |
| Formaldehyde | 21 gal |
| Potassium Bicarbonate | 1600 lbs |

TABLE 5

| | Production | |
|---|---|---|
| | Water, BWPD[a] | GAS, MSCF/D[b] |
| Initial | 8 | 140 |
| After Treatment | 0 | 0 |
| After Acidifying | 13 | 140 |

[a] BWPD means barrels water per day.
[b] MSCF/D means thousand standard cubic feet per day.

EXAMPLE 8

Restoring Selective Permeability

This example demonstrates the restoration of selective permeability to a previously treated subterranean formation.

A simulated brine was prepared by mixing about 1.827 g $NaHCO_3$, about 1.029 g, $MgSO_4$, about 12.987 g $CaCl_2$, about 2.235 g $MgCl_2.6H_2O$, and about 130.898 g NaCl about 3 liters of water. About 97 g of the synthetic brine was placed in a beaker equipped with a stirrer and about 0.4 g of Alcomer 90 brand 10 percent hydrolyzed polyacrylamide (available from Allied Colloids) was added to the stirred synthetic brine. After the added polymer had substantially dissolved in the synthetic brine, about 0.566 g of a potassium dichromate solution (about 10 weight percent) and about 1.7 g of a sodium thiosulfate solution (about 10 weight percent) were added to the beaker with stirring, the contents of the beaker being a gel-forming composition.

As part of the experiment, a Berea core was placed in a Hassler-type coreholder and heated to about 180° F. An overburden pressure of about 1500 psi was applied to the core using hydraulic oil and a backpressure regulator set at about 300 psi was attached to the outlet of the core. Baseline gas and water permeabilities were measured both at residual saturations and during simultaneous injection of gas and water. The core was then treated with three alternating slugs of the gel-forming composition and nitrogen in accordance with the protocol set forth in the following Table 6:

TABLE 6

| Slug | Volume, cc[a] | Injected Composition |
| --- | --- | --- |
| 1 | 4 | Gel forming composition |
| 2 | 2 | Nitrogen |
| 3 | 2 | Gel forming composition |
| 4 | 3 | Nitrogen |
| 5 | 1 | Gel forming composition |
| 6 | 2 | Nitrogen |
| Total Treatment Fluids | 14 | |

[a]Volume of nitrogen given at core conditions, namely, about 300 psi and about 180° F.

The sum of the injected volumes was equal to the pore volume of the Berea core. The core was then shut in for one day to allow the gel-forming composition to gel.

When the core was reopened, instead of allowing both gas and water to flow, the gas valve was kept closed while the polymer gel was subjected to a differential water pressure of about 220 psi across an approximately 2-in length of the core. This amounted to about a 1320 psi/ft pressure drop. The polymer gel was broken at this point and no longer able to selectively reduce the water permeability over that of the gas permeability. Both the gas and water permeabilities were similarly reduced to about 12–17% of their baseline permeabilities. However, during simultaneous injection of gas and water, the gas permeability did return to 100% of its baseline permeability measured during two-phase flow.

To repair (increase) the gas permeability while selectively maintaining the reduced water permeability at its post-polymer treatment level, a slug of nitrogen (about 50% pore volume) was injected into the outlet end of the core to displace any pore-blocking material such as water or degraded gel out of the pores and away from the core outlet. (The injection of the noncondensable gas, i.e., nitrogen, is also believed to reconnect the gas channels in at least a portion of the originally polymer-coated or gel-containing pores.) The results are shown in the Table 7 below:

TABLE 7

Berea Coreflood at 180° F.
1500 psi Overburden Pressure
300 psi Backpressure

| | PERMEABILITIES, md | | PERCENT OF BASELINE PERMEABILITY | | | |
| --- | --- | --- | --- | --- | --- | --- |
| | | | WATER | | GAS | |
| Step | WATER | GAS | RESID[a] | SIMUL[b] | RESID | SIMUL |
| Bsl[c] | 47.5 | 49.0 | 100 | — | 100 | — |
| Bsl | 41.8 | 2.3 | — | 100 | — | 100 |
| Polymer Treatment | | | | | | |
| 1stM[d] | 4.2 | 2.4 | — | 10.1 | — | 102.2 |
| 1stM | 5.9 | 7.0 | 12.3 | — | 14.4 | — |
| Rck[e] | 6.9 | 8.5 | 14.5 | — | 17.4 | — |
| Rck | 5.3 | 2.6 | — | 12.7 | — | 110.0 |
| Nitrogen Injection | | | | | | |
| 1stM | 1.4 | 14.7 | — | 3.5 | — | 631.5 |
| 1stM | 0.3 | 21.2 | 0.7 | — | 43.3 | — |
| Rck | 0.0 | 24.9 | — | 0.1 | — | 1067.8 |

[a]RESID means measured at residual saturations, i.e., single phase injection in the presence of a nonflowing second phase at constant pressure and flow rate of injected phase.
[b]SIMUL means measured during simultaneous injection of two phases at constant pressure and flow rate of injected phases.
[c]Bsl denotes baseline value.
[d]1stM denotes initial measurement reading.
[e]Rck denotes rechecked measurement reading.

After the injection of nitrogen to repair the gas permeability, the water permeability was reduced while the gas permeability increased. The gas permeability increased from about 15% to about 43% of its original permeability measured at residual water saturations. The water permeability measured at residual gas saturations dropped from about 14% to below about 1% of its original permeability. During simultaneous injection of gas and water, the gas permeability jumped to over about 1,000% of its baseline value measured during two-phase flow. The water permeability remained below about 1% of its baseline value when measured under simultaneous injection conditions.

Accordingly, Example 8 shows that gas permeability is repaired by displacing a pore-blocking material out of the obstructed pores and reconnecting the gas channels within the pores.

EXAMPLE 9

Carbon Dioxide Flood

An oil reservoir, consisting of a carbonate formation having four major producing zones separated by impermeable anhydrite layers, contains a light oil having an API gravity of 35°. Waterflooding is initially used to recover a portion of the original oil in place and a carbon dioxide flood is used to mobilize the remaining oil. Incremental oil recovery is expected to be achieved using the carbon dioxide flood. To recover a substantial amount of oil using the carbon dioxide flood, the injected carbon dioxide must contact most of the reservoir.

Carbon dioxide injection surveys show that most of the carbon dioxide enters zones 1, 2, and 4 with very little entering zone 3. To force carbon dioxide into zone 3, a gel pretreatment is designed. The gel is formulated to decrease water permeability in zones 1, 2 and 4 but to allow gas permeability into these same zones. The overall objective of the gel treatment is to force a greater percentage of the carbon dioxide into zone 3.

The treatment consists of three slugs of gel-forming composition alternated with three slugs of nitrogen. The gel-forming composition contains abut 4000 ppm of Allied Colloids 935 brand low hydrolysis, polyacrylamide polymer, about 600 ppm of potassium dichromate, about 1800 ppm of sodium thiosulfate, and about 10,000 ppm of potassium bicarbonate all mixed in field brine produced from the reservoir. Each of the gel-forming composition slug sizes are about 200 barrels in volume and are sequentially followed with a gas slug of about 100 barrels, measured at reservoir temperature and pressure. Following the third and final gas slug, the well is shut in for about three days to allow the gel to form.

After the well is reopened, about 200 barrels of water is initially injected followed by three days of carbon dioxide injection. The carbon dioxide mixes with the water to form an acidic aqueous solution. Contact of this solution with the gel forms pathways through the gel which fill with gas released from the bicarbonate present in the gel. The gel then becomes permeable to gas.

When a second survey is taken, the proportion of carbon dioxide entering zone 3 is expected to increase. After taking the second survey, carbon dioxide injection is resumed and, at six month intervals, gas entry surveys are rerun to ensure that the vertical distribution of carbon dioxide gas remains uniform. Due to the expected more uniform distribution of carbon dioxide through the oil containing zones of the reservoir, the amount of oil recoverable from the reservoir using the carbon dioxide flood is also expected to increase.

EXAMPLE 10

Steam Flooding

A California steam flood is in operation to recover a viscous 12° API crude. Surveys of the injected steam show a severe override of the steam near the top of the reservoir. Injection of a gel-forming composition to redirect the steam into the lower part of the reservoir is expected to improve the oil recovery by contacting more of the reservoir with heat. In addition, steam breakthrough at the producing wells located about 50 feet away is expected to be delayed due to the improved distribution of the injected steam.

The well is cooled down to about 250° F. by injecting water. About 200 barrels of a gel-forming composition containing about 2.5 weight percent of American Cyanamid Cyanagel 100 brand partially hydrolyzed, low molecular weight polyacrylamide polymer, about 0.25 weight percent of potassium dichromate, about 1.5 weight percent ammonium bicarbonate, and about 0.45 weight percent thiourea are injected into the formation. The fluids in the wellbore are displaced with nitrogen. The gel is allowed to form for about two days. Next, about 400 gallons of about 3 weight percent aqueous acetic acid are injected to create gas containing channels within the gel.

Steam injection is then resumed for about seven days before a gas survey is run again. The new survey is expected to show that a substantial proportion of the steam is being redirected to lower zones.

EXAMPLES 1-12

Comparative Gel Degradation Experiments

In comparative Examples 11-12, the degradation of two gels upon exposure to an acid was determined. The gels were made from the same ingredients except that potassium bicarbonate (a gas precursor) was incorporated into one of the gels.

More specifically, two sandpacks were prepared using Nevada 130 sand. The bulk volume and porosity of each sandpack was about 100 cm$^3$ and about 49%, respectively. Tap water having a pH of about 6.8 was used for flow rate measurements and for mixing the polymer gels. ORP-750 brand high molecular weight, very low hydrolysis polyacrylamide (available from Dai-Ichi Kogyo Seiyaku Co., Ltd. of Japan) was mixed by slow addition to the vortex formed from stirring water in a beaker at about 400 rpm. The speed was reduced to about 200 rpm and stirring continued for about 4 hours to fully hydrate the polymer. For one of the gels, about 1 weight percent potassium bicarbonate was added to the tap water prior to mixing the polymer. When each gel mixture was prepared, about 14 cm$^3$ of the prepared gel mixture was immediately injected into one of the sandpacks. Each gel solution was displaced into its sandpack by about 1 cc of tap water to prevent face plugging. The sandpacks were shut in for about three days before flowing water again. All rate measurements were done at about 4 psi. The test protocol and results are summarized in the following Table 8:

TABLE 8

| ACTION | PARAMETER CALCULATED | EXAMPLE 11 | EXAMPLE 12 |
|---|---|---|---|
| Flow water | Initial permeability, $k_i$ | 1184 | 1272 |
| Inject gel | Gel solution | | |
| | Gel, % pore volume | 31.7 | 28.7 |
| | ORP 750 Polymer, wt % | 0.4 | 0.4 |
| | Sodium Dichromate, wt % | 0.16 | 0.16 |
| | Sodium metabisulfite, wt % | 0.16 | 0.16 |
| | Potassium Bicarbonate, wt % | — | 1.0 |
| | pH | 5.8 | 8.5 |
| Flow water | Post gel permeability, $k_g$ | 0.36 | 0.69 |
| | Gel resistance factor, $k_i/k_g$ | 3317 | 1849 |
| Flow acid | 6 weight % HCl Pore Volume, % | 8.7 | 5.4 |
| Flow water | Post acid permeability, $k_a$ | 2.5 | 13.9 |
| | Acid improvement factor, $k_a/k_g$ | 5.6 | 20.2 |

The results set forth in Table 8 show that by incorporating a gas precursor into a gel, the same acid treatment is capable of restoring permeability to a gel-containing formation over three times better than when the gel is substantially devoid of the gas precursor.

Although the present invention has been described in considerable detail with reference to some preferred versions, other versions are possible. For example, in addition to treating subterranean formations containing natural resources to selectively reduce the flow of an aqueous fluid with respect to that of a nonaqueous fluid, the methods of the invention are also applicable for remedially treating man-made formations, such as toxic landfills, to selectively reduce the flow of water or other aqueous fluids with respect to nonaqueous contaminants emanating from the toxic landfill. By reducing the effluent from the landfill to primarily the nonaqueous contaminants, a cost savings is potentially achievable because it is then necessary to collect and treat a smaller volume of fluids. In addition, the present invention is suitable for use in treating both fractured and unfractured formations. Furthermore, besides being used to conform the vertical gas permeation profile to improve the distribution and migration of gases in the more conventional enhanced oil recovery techniques discussed above, the present invention can be used to conform the vertical gas permeability profile to improve the organic vapor enhanced oil recovery technique disclosed in U.S. patent application Ser. No. 07/589,097, filed Sep. 27, 1990, and incorporated herein in its entirety by reference. Also, if the water/hydrocarbon production ratio should increase after a production well has been treated in accordance with any of the selective reduction methods of the present invention discussed in above section A, the selective permeability restoration method described in section B, supra, can be employed to readily reduce this ratio. Therefore, the spirit and scope of the appended claims should not necessarily be limited to the description of the preferred versions contained herein.

What is claimed is:

1. A method for selectively reducing the flow of an aqueous fluid with respect to the flow of a nonaqueous fluid in a subterranean formation, the method comprising the steps of:
   (a) injecting into at least a portion of a subterranean formation a composition comprising a gas precursor and one or more ingredients capable of reacting to form a gel;
   (b) allowing the composition to form the gel; and
   (c) subjecting the gas precursor to conditions that convert at least a portion of the gas precursor into a gas during at least a portion of step (b) so that at least a portion of the gel has pathways therein containing the gas.

2. The method of claim 1 wherein the composition further comprises a delayed acting substance and step (c) includes the step of modifying at least a portion of the delayed acting substance to form an active material that transforms at least a portion of the gas precursor into the gas.

3. The method of claim 1 wherein the composition further comprises a delayed acting substance, step (c) includes the step of modifying at least a portion of the delayed acting substance to form an active material that converts at least a portion of the gas precursor into the gas, and the step (b) further comprises injecting a gas into at least a portion of the composition present in the subterranean formation.

4. The method of claim 1 wherein step (b) further comprises injecting a gas into at least a portion of the composition present in the subterranean formation.

5. The method of claim 1 wherein the composition further comprises a delayed pH modifying agent and in step (c) at least a portion of the delayed pH modifying agent is activated to form an active pH modifying agent that converts at least a portion of the gas precursor into the gas.

6. The method of claim 1 wherein the composition further comprises an acid precursor and in step (c) at least a portion of the acid precursor yields an acid that converts at least a portion of the gas precursor into the gas.

7. The method of claim 1 further comprising the steps of:
   (d) substantially reducing fluid permeability in at least one of the less permeable zones of the formation prior to performing steps (a)–(c); and
   (e) after performing steps (a)–(c), restoring fluid permeability in at least one of the zones wherein the fluid permeability was substantially reduced in step (d).

8. The method of claim 1 wherein step (a) includes the step of injecting the composition through a production well into at least a portion of the subterranean formation.

9. The method of claim 1 wherein the nonaqueous fluid is selected from the group consisting of liquid hydrocarbons, gaseous hydrocarbons, and gaseous nonhydrocarbons.

10. The method of claim 1 wherein the nonaqueous fluid is a gaseous hydrocarbon.

11. The method of claim 1 wherein the composition further comprises a crosslinking agent.

12. The method of claim 1 wherein the gas precursor is temperature-activated.

13. The method of claim 1 wherein the composition further comprises an acid precursor, step (c) includes the step of modifying at least a portion of the acid precursor to yield an acid that converts at least a portion of step (b) so that at least a portion of the gel has pathways therein containing the gas; step (b) further comprises injecting a gas into at least a portion of the subterranean formation occupied by the composition; and the method further comprises the step (d) of contacting at least a portion of the gel with an acid.

14. The method of claim 1 wherein the composition further comprises an acid precursor, step (c) includes the step of modifying at least a portion of the acid precursor to yield an acid that converts at least a portion of the gas precursor into the gas during at least a portion of step (b) so that at least a portion of the gel has pathways therein containing the gas, and the method further comprises the step of (d) contacting at least a portion of the gel with an acid.

15. A method for selectively reducing the flow of an aqueous fluid with respect to the flow of nonaqueous fluid in a subterranean formation, the method comprising the steps of:
   (a) injecting into at least a portion of a subterranean formation a composition comprising a gas precursor and one or more ingredients capable of reacting to form a gel;
   (b) allowing the composition to form the gel; and
   (c) injecting a gel decomposing agent into at least a portion of the subterranean formation for the gel decomposing agent to contact (i) at least a portion of the gas precursor to convert at least a portion of the gas precursor into a gas and (ii) at least a portion of the gel to form pathways containing the gas in at least a portion of the gel.

16. A method for selectively reducing the flow of an aqueous fluid with respect to the flow of a nonaqueous fluid in a subterranean formation, the method comprising the steps of:
   (a) injecting into at least a portion of a subterranean formation a composition comprising one or more ingredients capable of reacting to form a gel;
   (b) allowing the composition to form the gel; and
   (c) injecting a gas into at least a portion of the composition so that at least a portion of the gel has gas-containing pathways therein.

17. A method for selectively reducing the flow of an aqueous fluid with respect to the flow of a nonaqueous fluid in a subterranean formation, the method comprising the steps of:
   (a) injecting a gas precursor-containing gel into at least a portion of a subterranean formation under conditions that shear at least a portion of the gel;
   (b) allowing the sheared gel to heal and form a healed gel; and
   (c) subjecting the gas precursor to conditions that transform at least a portion of the gas precursor into a gas during at least a portion of step (b) so that at least a portion of the healed gel has pathways therein containing the gas.

18. A method for selectively reducing the flow of an aqueous fluid with respect to the flow of a nonaqueous fluid in a subterranean formation, the method comprising the steps of:
(a) injecting an acid precursor-containing gel into at least a portion of a subterranean formation under conditions that shear at least a portion of the gel;
(b) allowing the sheared gel to heal and form a healed gel; and
(c) subjecting the acid precursor to conditions that transform at least a portion of the acid precursor into an acid so that at least a portion of the healed gel has pathways therein.

19. A method for selectively reducing the flow of an aqueous fluid with respect to the flow of a nonaqueous fluid in a subterranean formation, the method comprising the steps of:
(a) injecting a gel into at least a portion of a subterranean formation under conditions that shear at least a portion of the gel;
(b) injecting a gas into at least a portion of the sheared gel; and
(c) allowing the sheared gel to heal and form a healed gel having pathways therein containing the gas.

20. A method for selectively reducing the flow of an aqueous fluid with respect to the flow of a nonaqueous fluid in a subterranean formation, the method comprising the steps of:
(a) injecting into at least a portion of a subterranean formation a composition comprising an acid precursor and an ingredient capable of transforming the composition into a gel;
(b) allowing the composition to form the gel; and
(c) subjecting the acid precursor to conditions that transform at least a portion of the acid precursor into an acid so that at least a portion of the healed gel has pathways therein.

21. A recovery system comprising:
(a) a subterranean formation;
(b) a well penetrating at least a portion of the subterranean formation; and
(c) a gel having gas-containing pathways therein, the gel being located in at least a portion of the subterranean formation and being formed by the method of claim 1.

22. A recovery system comprising:
(a) a subterranean formation;
(b) the subterranean formation; and (c) a gel having gas-containing pathways therein, the gel being located in at least a portion of the subterranean formation and being formed by the method of claim 16.

23. A recovery system comprising:
(a) a subterranean formation;
(b) a well penetrating at least a portion of the subterranean formation; and
(c) a gas-containing, healed gel, the gas-containing, healed gel being formed by the method of claim 17.

24. A recovery system comprising:
(a) a subterranean formation;
(b) a well penetrating at least a portion of the subterranean formation; and
(c) a pathway-containing, healed gel, the pathway-containing, healed gel being formed by the method of claim 18.

25. A recovery system comprising:
(a) a subterranean formation;
(b) a well penetrating at least a portion of the subterranean formation; and
(c) a gas-containing, healed gel, the gas-containing, healed gel being formed by the method of claim 19.

26. A recovery system comprising:
(a) a subterranean formation;
(b) a well penetrating at least a portion of the subterranean formation; and
(c) a pathway-containing, healed gel, the pathway-containing, healed gel being formed by the method of claim 20.

27. A recovery system comprising:
(a) a subterranean formation;
(b) a well penetrating at least a portion of the subterranean formation; and
(c) a gel located in at least a portion of the subterranean formation, at least a portion of the gel having pathways therein and a noncondensable gas being present in at least a portion of the passageways in a sufficient concentration for gas to flow.

28. A method comprising the steps of:
(a) injecting into at least a portion of a subterranean formation a composition comprising one or more ingredients capable of reacting to form a gel;
(b) allowing the composition to form a gel that plugs at least a portion of the subterranean formation and decreases the flow rate of a fluid through at least a portion of the plugged subterranean formation, the gel being selected from the group consisting of gas precursor-containing gels, gels having gas-containing pathways, and gels containing at least one gas precursor and a plurality of pathways; and
(c) injecting a gel degrading agent into at least a portion of the subterranean formation to contact at least portion of the gel and restore the flow rate of the fluid through at least a portion of the plugged subterranean formation.

29. The method of claim 28 wherein the restored flow rate through the plugged subterranean formation after step (c) is at least twice the flow rate obtainable if the gel were substantially devoid of the gas precursor and the pathways.

30. The method of claim 28 wherein the restored flow rate through the plugged subterranean formation after step (c) is at least twenty five times the flow rate obtainable if the gel were substantially devoid of the gas precursor and the pathways.

* * * * *

UNITED STATES PATENT AND TRADEMARK OFFICE
CERTIFICATE OF CORRECTION

PATENT NO. : 5,145,012

DATED : September 8, 1992

INVENTOR(S) : Richard D. Hutchins, Burton B. Sandiford, and Hoai T. Dovan

It is certified that error appears in the above-identified patent and that said Letters Patent is hereby corrected as shown below:

Claim 15, column 26, line 29, after the word "of" insert -- a --.

Claim 22, column 27, line 51, after "(b)" insert -- a well penetrating at least a portion of --.

Claim 28, column 28, line 46, after "least" insert -- a --.

Signed and Sealed this

Seventh Day of September, 1993

Attest:

BRUCE LEHMAN

*Attesting Officer*   *Commissioner of Patents and Trademarks*